C. A. DOREMUS.
PROCESS OF MAKING POTASSIUM SULFATE, &c.
APPLICATION FILED APR. 13, 1912.
1,054,518.  Patented Feb. 25, 1913.
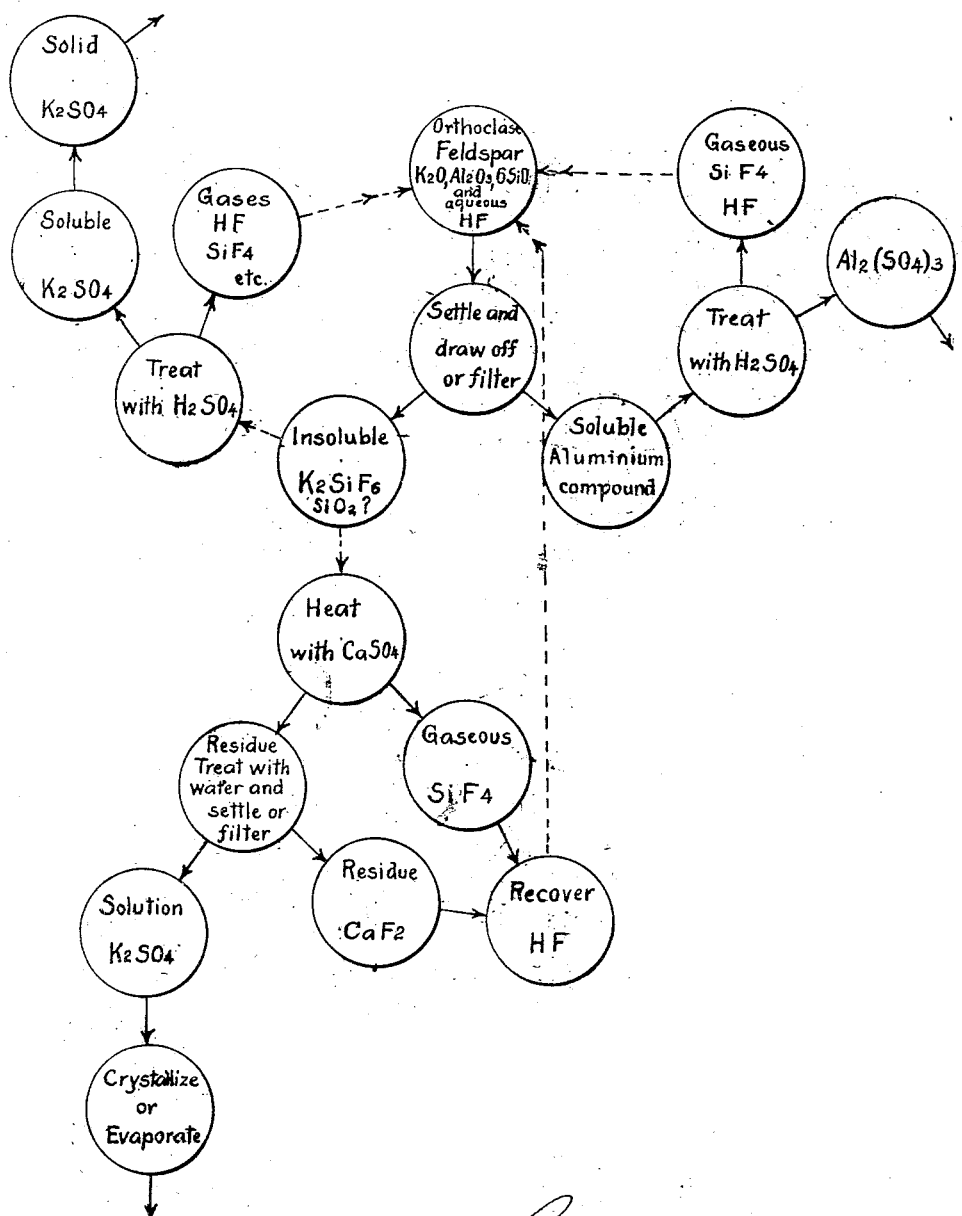

_UNITED STATES PATENT OFFICE._

CHARLES A. DOREMUS, OF NEW YORK, N. Y., ASSIGNOR OF ONE-HALF TO JOHN SHERMAN HOYT, OF DARIEN, CONNECTICUT.

PROCESS OF MAKING POTASSIUM SULFATE, &c.

1,054,518.      Specification of Letters Patent.      Patented Feb. 25, 1913.

Application filed April 13, 1912. Serial No. 690,591.

*To all whom it may concern:*

Be it known that I, CHARLES A. DOREMUS, a citizen of the United States, and a resident of New York, county of New York, and State of New York, have invented certain new and useful Improvements in Processes of Making Potassium Sulfate, &c., of which the following is a specification.

My invention relates to improvements in processes for making potassium sulfate and the like, and more particularly to a process for making potassium sulfate from refractory silicates and certain steps therein.

One object of my invention is to provide not only a cheap and efficient commercial method by which sulfates of the alkali metals may be obtained from the corresponding silicofluorids of these metals, but also a cheap and efficient method by which the silicofluorids of the alkali metals may be obtained from refractory silicates especially the feldspars and a general commercial method for obtaining both potash and a useful aluminum compound from refractory feldspathic materials.

The drawing is a diagram illustrating different steps of my improved process.

It has been suggested that feldspar may be decomposed by hydrofluosilicic acid to obtain the separate silicofluorids of potassium and aluminum. Although feldspar is very common and found in large quantities in this country, so far as I am aware no process has been successfully and commercially carried out to obtain the valuable and much desired potassium sulfate ($K_2SO_4$), so valuable for fertilizers. There are probably several reasons why the hydrofluosilicic acid method has not been used.

In the best form of my improved process I treat finely powdered orthoclase or the double silicate of potassium and aluminum ($K_2O, Al_2O_3, 6SiO_2$) with aqueous hydrofluoric acid in the proportions of 20 parts by weight of the powdered potash feldspar to 129 parts of the aqueous hydrofluoric acid containing 20% of real acid at a temperature of about 50° C., stirring the mixture thoroughly. The proportions will of course vary with different feldspars or silicates used according to the percentages of different metals present. The mixture becomes further heated by the chemical actions which take place and there results in a short time a complete decomposition of the feldspar. I then cool the mass somewhat and filter out the insoluble potassium silicofluorid, leaving the aluminium compound in solution. The aluminium compound may be treated in any suitable manner to obtain other useful aluminium compounds; for instance, it may be treated with sulfuric acid in a known manner to produce aluminium sulfate, and the silicon tetrafluorid, hydrofluoric acid, etc., may be treated to recover hydrofluoric acid to be again used in the first step of the process.

According to one form of my invention the potassium silicofluorid may be treated in any known manner to obtain a useful potassium compound or compounds as by the known treatment with sulfuric acid, whereby potassium sulfate is obtained, and the fluorin may be suitably recovered by any known method to be again used in the first step. This method, however, has many disadvantages. When the $K_2SiF_6$ is heated with an excess of the concentrated sulfuric acid, hydrofluosilicic acid is driven off more or less decomposed and some acid potassium sulfate is produced, and this must be heated to produce the neutral or normal sulfate. I therefore prefer to treat the potassium silicofluorid according to my improved method which not only avoids these disadvantages but has several distinct advantages, including cheapening the production in several ways. To do this according to the best form of my method, I take the dry potassium silicofluorid and intimately mix therewith finely powdered calcium sulfate, preferably anhydrous, and preferably in molecular proportions. If gypsum be used I use 220.5 lbs. of potassium silicofluorid and 172.19 lbs. of the finely ground gypsum. I next heat this mixture in a suitable retort or muffle. I have found that heating to incipient red heat yields good results. The mass is left in a form easy to leach. The escaping gases, principally silicon tetrafluorid ($SiF_4$) are conducted to appropriate condensing apparatus and the fluorin may be recovered as hydrofluosilicic or hydrofluoric acid, to be again used in the first step of the process, according to the form of the invention employed. The residue which consists of a soft friable mass is then lixiviated with hot water. The potassium sulfate dissolves in the water and is easily secured in crystalline form by known methods, or by evaporation. The calcium fluorid which remains undissolved is collected and sold as such, or it may be treated according to any known method to recover hydrofluoric acid to be again used in the first step of the process. Instead of using calcium sulfate I find that barium sulfate as either natural barytes, "heavy spar," or that artificially prepared, may be used in a similar manner. Strontium sulfate which acts similarly and magnesium sulfate, preferably anhydrous, may also be used to react with the silicofluorid of the alkali metal to produce the sulfate of said metal. All these I include in the term "sulfates of the alkaline earth metals," and any one or more of them may be used with success, although the calcium sulfate is preferred. Other reagents may also be found which react with the silicofluorid to produce a soluble salt of the alkali metal or metals, and an insoluble fluorid.

While I prefer orthoclase feldspar ($K_2O,Al_2O_3,6SiO_2$) as a base, and while the use of this distinct silicate has many advantages over other silicates, nevertheless other refractory silicates such as microcline and the potash bearing micas may be used. Other silicates including those of sodium, may also be used as a base, and separated, and may then be treated according to the improved second step of my process in order to obtain soluble sodium compounds, etc. Moreover, while the use of aqueous hydrofluoric acid has distinct advantages in the first step of the process since it acts almost instantaneously, causing a complete reaction quickly and because it requires no heat and leaves the insoluble silicofluorid of the metal or metals of the alkalis substantially pure and free from silica, nevertheless other flourin acids such as hydrofluosilicic, when followed by my improved method of treating the silicofluorid, may be used with some success, as thereby certain of the disadvantages are removed.

My process has a further distinct advantage in that besides obtaining the potassium sulfate in a cheap manner from the common feldspar, at the same time, I obtain by-products, including certain useful and valuable aluminum compounds.

Although I have described my improvements with respect to certain embodiments with great detail, nevertheless I do not desire to be limited to such details except as clearly specified in the appended claims, since many changes and modifications may well be made without departing from the spirit and scope of my invention in its broader aspects.

Having fully and clearly described my improvements, what I claim as new and desire to secure by Letters Patent, is:

1. The improved process of making potassium sulfate, which comprises heating potassium silicofluorid with calcium sulfate and disolving out the potassium sulfate.

2. The improved process of making potassium sulfate, which comprises treating potassium silicofluorid with a sulfate of one or more of the alkaline earth metals.

3. The improved method of producing sulfates of the alkali metals, which comprises treating a silicofluorid of an alkali metal with a sulfate of one or more of the alkaline earth metals to produce a sulfate of the alkali metal.

4. The improved method of making sulfates of the alkali metals, which comprises heating substantially to incipient red heat, a silicofluorid of an alkali metal with a sulfate of one or more of the alkaline earth metals.

5. The improved method of making sulfates of the alkali metals, which comprises heating a silicofluorid of an alkali metal with a sulfate of one or more of the alkaline earth metals in the proportion of their molecular weights.

6. The production of a sulfate of an alkali metal by heating the silicofluorid of the alkali metal with an anhydrous sulfate of an alkaline earth metal, substantially as described.

7. The improved method of producing sulfates of the alkali metals, which comprises treating a silicofluorid of an alkali metal with a sulfate of one or more of the alkaline earth metals to produce a sulfate of the alkali metal, then separating the soluble sulfate of the alkali metal from the insoluble fluorid of the alkaline earth metal by means of a suitable solvent, substantially as described.

8. The production of potassium sulfate by heating potassium silicofluorid with a sulfate of an alkaline earth metal, in the proportion of their molecular weights, to incipient red heat, lixiviating the resulting mass with water, separating the soluble potassium sulfate from the insoluble calcium fluorid and crystallizing the potassium sulfate, substantially as described.

9. The improved method of obtaining useful compounds from refractory feldspars, which consists in treating the refractory feldspar with aqueous hydrofluoric acid, separating the insoluble potassium silicofluorid and the soluble aluminium compound, heating the potassium silicofluorid with calcium sulfate and dissolving out the resulting potassium sulfate.

10. The improved method of obtaining useful compounds from refractory silicates, which consists in treating the refractory silicate with aqueous hydrofluoric acid, separating the insoluble potassium silicofluorid and the soluble aluminium compound, and treating the potassium silicofluorid with a suitable reagent to obtain a useful potassium compound.

11. The improved method of treating refractory silicates containing one or more alkali metals and one or more other metals, which consists in treating the silicate with aqueous hydrofluoric acid to produce an insoluble compound of the alkali metal or metals and a soluble compound of the other metal or metals, and then separating the soluble compound or compounds from the insoluble compound or compounds to obtain useful products thereof.

12. The improved method of producing useful compounds from refractory silicates of potassium and aluminium, which consists in treating the silicate with a fluorin acid, separating the insoluble potassium silicofluorid and the soluble aluminium compound, and treating the potassium silicofluorid with a sulfate of a metal of the alkaline earths, and separating out the resulting potassium sulfate.

13. The improved method of making useful compounds from refractory silicates, which consists in treating the refractory silicate with aqueous hydrofluoric acid, separating the insoluble from the soluble constituents produced thereby and treating the insoluble constituent with a sulfate of an alkaline earth metal.

14. The improved method of obtaining useful compounds from refractory silicates, which consists in treating the refractory silicate with a fluorin acid, to produce an insoluble silicofluorid of a metal of the alkalis and a soluble compound, then treating the insoluble silicofluorid with a sulfate of an alkaline earth metal to produce a sulfate of the alkali metal.

15. The improved method of obtaining useful compounds from orthoclase, which consists in treating the feldspar with aqueous hydrofluoric acid, separating the insoluble potassium silicofluorid and the soluble aluminium compound, and heating the potassium silicofluorid with a sulfate of an alkaline earth metal to obtain potassium sulfate.

16. The improved method of making potassium sulfate from orthoclase, which consists in treating the orthoclase with aqueous hydrofluoric acid in substantially the proportion of 20 parts powdered potash feldspar to 129 parts of aqueous hydrofluoric acid containing 20% real acid, separating out the insoluble potassium silicofluorid and treating said potassium silicofluorid with a reagent to obtain potassium sulfate.

17. The improved method of making potassium sulfate from orthoclase, which consists in treating the orthoclase with aqueous hydrofluoric acid in substantially the proportion of 20 parts powdered potash feldspar to 129 parts of aqueous hydrofluoric acid containing 20% real acid, separating out the insoluble potassium silicofluorid and treating said potassium silicofluorid dry with a sulfate of an alkaline earth metal to obtain potassium sulfate.

18. The improved method of making soluble salts of the alkali metals, which consists in heating to incipient red heat a silicofluorid of the alkali metal with a reagent to produce a soluble salt of the alkali metals and an insoluble fluorid.

19. The improved method of producing useful compounds from refractory silicates of potassium and aluminium, which consists in treating the silicate with a fluorin acid, separating the insoluble potassium silicofluorid and the soluble aluminium compound, and treating the potassium silicofluorid with a salt of an alkaline earth metal to produce a soluble potassium salt and an insoluble fluorid.

In testimony whereof, I have signed my name to this specification, in the presence of two subscribing witnesses.

CHARLES A. DOREMUS.

Witnesses:
 GORHAM CROSBY,
 EDWIN SEGER.